United States Patent Office 2,814,821
Patented Dec. 3, 1957

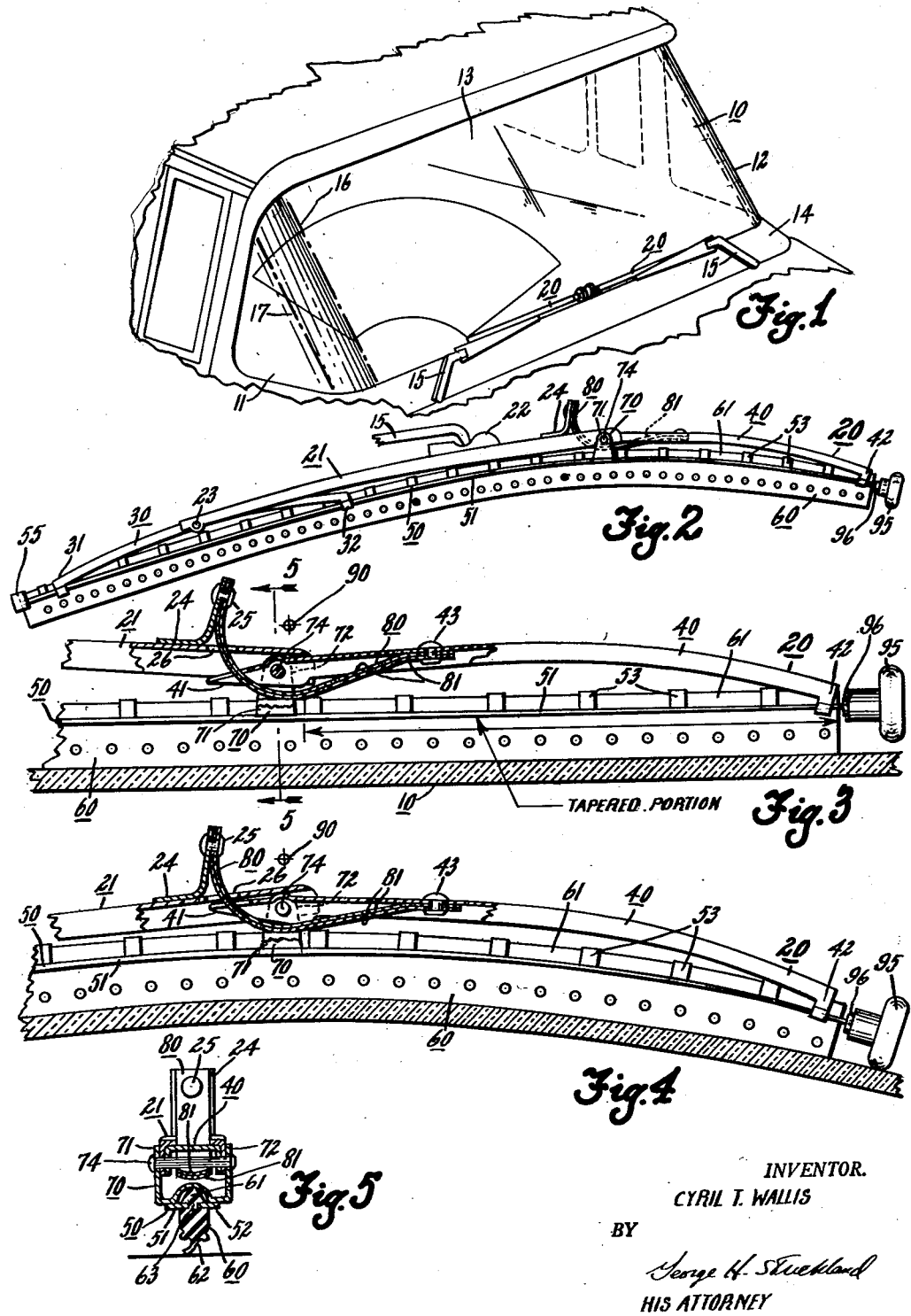
Dec. 3, 1957 — C. T. WALLIS — 2,814,821
WINDSHIELD WIPER BLADE ASSEMBLY
Filed May 10, 1954
INVENTOR.
CYRIL T. WALLIS
BY
George H. Strickland
HIS ATTORNEY

2,814,821

WINDSHIELD WIPER BLADE ASSEMBLY

Cyril T. Wallis, Brockport, N. Y., assignor to General Motors Corporation, Detroit, Mich., a corporation of Delaware Application May 10, 1954, Serial No. 428,565

19 Claims. (Cl. 15—245)

This invention pertains to window cleaners, and particularly to a device for wiping curved, as well as substantially planar surfaces.

Heretofore, windshield wiper blade assemblies have been designed for cleaning curved and substantially planar surfaces, one type of blade being disclosed in the Anderson Patent No. 2,596,063. However, this type of blade was neither designed, nor does it properly clean a sharply curved window, commonly known as a wraparound windshield. The wraparound windshield includes end sections which are disposed in substantially parallel, spaced, vertical planes on opposite sides of a vehicle, and the transparency extends throughout an arcuate distance of substantially 180°. Accordingly, among my objects are the provision of a wiper blade assembly for effectively cleaning substantial portions of a wraparound windshield; the further provision of a wiper blade assembly capable of connection to conventional wiper arms; the further provision of a wiper blade assembly including means for preventing crowding of the squeegee element against a sharply curved surface; and the still further provision of a wiper blade assembly adapted to clean curved, as well as substantially planar, surfaces including means for applying substantially constant conforming pressure to the outer end of the blade.

The aforementioned and other objects are accomplished in the present invention by providing a spring biased, cantilever arm which exerts a substantially constant force on the outer end of the backing strip irrespective of the angular relationship between the wiper and the cantilever arm. Specifically, the blade assembly includes a primary yoke, or holder, having arm attaching means of conventional construction whereby the blade assembly of this invention may be used with present day wiper arms. One end of the holder is pivotally connected to an intermediate portion of a secondary yoke, or equalizer arm, opposite ends of which are movably connected to longitudinally spaced points of a resilient, flexible backing strip. The outer end of the holder is pivotally connected to a cantilever arm, the pivot point connection therebetween being carried by the upstanding legs of a U-shaped member which is welded, or otherwise suitably connected to the flexible backing strip. The free end of the cantilever arm is slidably connected to the backing strip adjacent the outer end thereof. Thus the wiper arm applies wiping pressure through the holder to four longitudinally spaced points on the backing strip, namely, the end of the cantilever arm, the U-shaped member, and the ends of the secondary yoke.

In order to prevent excessive tilting of the flexible wiping element, or squeegee, relative to the backing strip so as to prevent crowding thereof which overloads the wiper motor, a roller is rotatably supported by a pin or a stub shaft, which is located in alignment with the axis of the backing strip. The function of the roller is identical to that disclosed in my copending applications, Serial Nos. 428,562 and 428,563, as well as copending application, Serial No. 428,561, filed in the name of Grant E. Sanden, et al., which applications were filed of even date herewith. Thus, when the wiper blade traverses a sharply curved surface, the roller will engage the surface so as to limit tilting of the flexible squeegee element relative to the backing strip.

In addition, in the instant wiper blade assembly, the flexible backing strip, or more particularly, the spaced longitudinally extending flanges thereof, are tapered in thickness from the U-shaped member to the outer type thereof. As disclosed herein, the thickness of the flanges progressively decreases from the U-shaped member to the outer end thereof enabling the flexible backing strip to function as a true cantilever spring so as to readily conform to any surface curvature. Moreover, it will be appreciated that the cantilever arm moves through a substantial angle relative to the primary yoke as the blade traverses a surface having sharply curved and substantially planar portions. It will further be appreciated that in order to effect proper cleaning of the surface, the end of the cantilever arm which is slidably connected to the backing strip must exert substantially the same force thereon at all times irrespective of the angular relationship between the cantilever arm and the primary yoke. In the present invention, this objective is achieved by incorporating resilient means for normally biasing the cantilever arm so as to deform the flexible backing strip and wiping element. The resilient means may comprise one or more spring strips having an arcuate cross section, the axis of curvature being in alignment with, but spaced from the edges of the spring strip. Opposite ends of the spring strip are anchored to the primary yoke and cantilever arm, respectively, with the concave surface of the strip facing the primary yoke and cantilever arm. The spring strip, or strips, are also bent through an arc having a predetermined radius, thereby enabling the end of the spring attached to the cantilever arm to move throughout a substantial angle without changing the force, or pressure, applied to the cantilever arm.

Further objects and advantages of the present invention will be apparent from the following description, reference being had to the accompanying drawing wherein a preferred embodiment of the present invention is clearly shown.

In the drawing:

Fig. 1 is a fragmentary view, in perspective, of a vehicle having a wraparound windshield, and depicting the area to be cleaned by a windshield wiper.

Fig. 2 is a side view, in elevation, of a wiper blade assembly constructed according to this invention.

Fig. 3 is an enlarged fragmentary view, partly in section and partly in elevation, depicting operation of the wiper blade when traversing a substantially planar surface.

Fig. 4 is a view similar to Fig. 3 depicting operation of the blade assembly when traversing a sharply curved surface.

Fig. 5 is a sectional view taken along line 5—5 of Fig. 3.

With particular reference to Fig. 1, the present invention is directed to a wiper blade assembly for effectively cleaning substantial portions of the front and side sections of a wraparound windshield, generally indicated by the numeral 10. As seen in the drawing, the wraparound windshield 10 includes side portions 11 and 12 that are disposed in substantially parallel, spaced, vertical planes on opposite sides of a vehicle, and a front portion 13. Thus, it is apparent that the vehicular transparency extends through an arcuate distance of substantially 180°. The portion of the vehicle depicted in Fig. 1 is shown as including a cowl, or rail portion, 14 through which a pair of spaced wiper shafts, not shown, project and are operatively connected to a pair of conventional wiper arms, designated by the numeral 15. Each wiper arm is detachably connected to a wiper blade generally depicted by the numeral 20.

Present day wiper blade assemblies of the type disclosed in the aforementioned patent can only be used to effectively clean that portion of the windshield between the cowl 14 and dotted line 16 in Fig. 1. My studies have indicated that present day wiper blades cannot be used to effectively clean a portion of the windshield surface between dotted lines 16 and 17 due to the fact that conventional blade assemblies do not readily conform to a sharp curved surface, and the wiping element, or squeegee, crowds the windshield as it traverses a sharply curved surface thereby overloading the wiper motor. The blade assembly of this invention is capable of effectively cleaning a wraparound windshield throughout an arcuate distance of substantially 150° from the cowl portion 14 of the vehicle.

With particular reference to Figs. 2 through 5, the improved wiper blade assembly 20 of this invention includes a holder, or primary yoke, 21 having conventional arm attaching means 22 to which the end of a conventional wiper arm 15 may be detachably connected. It is to be understood that the wiper arm 15 includes resilient means for applying wiping pressure to the primary yoke, or holder, 21, which, in turn, distributes this pressure to the blade assembly to be described. The inner end of the holder 21 is pivotally connected at 23 to an intermediate portion of a secondary yoke 30. The outer end of the holder 21 is operatively connected to a cantilever arm 40 having a generally arcuate configuration, as shown in Fig. 2.

Opposite ends 31 and 32 of the secondary yoke 30 are movably connected to longitudinally spaced points of a flexible, resilient backing strip, generally designated by the numeral 50. As seen particularly in Fig. 5, the backing strip is generally of conventional construction in that it is constructed from an integral piece of metal and includes a pair of spaced, longitudinally extending flanges 51 and 52, as well as a plurality of spaced hooks, or eyelets, 53. Furthermore, in accordance with conventional practice, either end of the secondary yoke 30, but preferably the end 31 thereof, is associated with tangs, not shown, on the flexible backing strip so as to limit relative longitudinal movement therebetween.

Similarly, the wiping element, or squeegee, 60 is of conventional construction in that it includes a retention portion 61, generally triangular in cross section; a wiping portion 62; and a reduced neck portion 63, which interconnects the retention and wiping portions and which permits pivotal movement therebetween. The squeegee element 60 is retained in assembly with the flexible backing strip 50 by inserting the triangular portion 61 thereof into the hooks, or eyelets, 53 with the side flanges 51 and 52 of the backing strip disposed in the grooves between the retention and wiping portions. It will be understood that the interconnection between the squeegee 60 and the backing strip 50 permits unlimited tilting movement of the squeegee relative thereto. The backing strip may also support an abutment member 55, which prevents separation of the squeegee and the backing strip.

As is seen particularly in Fig. 5, the intermediate portion of the backing strip 50 has suitably attached thereto a U-shaped member 70, having upstanding leg portions 71 and 72. The U-shaped legs 71 and 72 are formed with aligned openings through which a pin 74 is inserted and retained. The pin 74 also passes through aligned openings in the end of primary yoke 21, as well as the end of the cantilever arm 40. Thus, the pin 74 serves as a common pivot for the primary yoke 21 and the cantilever arm 40.

From an inspection of Figs. 3 and 4, it may further be seen that the cantilever arm 40 is formed with a tang portion 41, which is arranged to cooperate with the inner peripheral surface of the holder 21 so as to limit clockwise pivotal movement of the cantilever arm 40 relative to the holder 21, as viewed in Figs. 2 through 4. It should also be noted that the tang portion is bifurcated, the reason for which will be described more particularly hereinafter.

The free end 42 of the cantilever arm is slidably connected to the outer end of the flexible backing strip 50. The slidable connection between the free end 42 and the flexible backing strip 50 may be of the type disclosed in the aforementioned copending applications wherein a comparable member is formed with portions that embrace the side flanges 51 and 52 of the backing strip so as to permit relative longitudinal movement therebetween. It should also be noted that the cantilever arm 40 is of longitudinally arcuate configuration. Furthermore, the cantilever arm 40 is biased by resilient means 80 so as to normally deform the flexible backing strip and squeegee to a concave configuration, as depicted in Fig. 2. The resilient means 80, as shown, includes a plurality of spring strips 81 having an arcuate cross section, as shown in Fig. 5. One end of the spring strips 81 are anchored to a bracket 24 attached to the holder 21 by means of a rivet 25. The spring strips 81 pass through an aperture 26 in the holder 21, through the bifurcated portion of the tang 41, and the other ends thereof are anchored by means of a rivet 43 to the cantilever arm 40. It is to be understood that while a plurality of spring strips are disclosed in the drawing, this is only by way of example and is not to be construed as a limitation since a single strip may suffice if the desired spring load, or force, can be realized.

From an inspection of Fig. 5, it may also be noted that the concave surfaces of the strips 81 face the inner periphery of the cantilever arm 40. Furthermore, the spring strips 81 are bent on an arc having a predetermined radius, the center of the arc being indicated by numeral 90 in Figs. 3 and 4. In the particular blade configuration disclosed, the radius is .45". However, this particular radius is, likewise, to be considered exemplary, as the only criticality resides in the fact that the resilient means 80 must move throughout a substantial angle without appreciably changing the force, or spring load, applied to the cantilever arm 40.

It should also be noted that the present wiper blade incorporates four pressure applying points between the flexible backing strip and the pressure distributing means comprising the holder 21, the secondary yoke 30, and the cantilever arm 40. Furthermore, as depicted in Figs. 3 and 4, the side flanges 51 and 52 of the flexible backing strip are tapered from the U-shaped member 70 to the outer end of the blade. The purpose of this gradually tapering thickness or decreasing cross sectional area, is to enable the backing strip to function as a true cantilever spring, thereby assuring that the flexible backing strip and squeegee will readily conform to any surface curvature. The reason that only the outer end of the flexible backing strip is so tapered is due to the fact that with present day wraparound windshields, only the outer one-third of the blade traverses the sharply curved window section. In actual construction, the side flanges 51 and 52 may have a constant thickness of .022" from the U-shaped member 70 inwardly, while the thickness will gradually taper from .022" to .016" outwardly of the U-shaped member 70. If necessary the opposite ends of the side flanges 51 and 52 may also be of tapering thickness.

It will further be observed that inasmuch as the cantilever arm 40 is required to move throughout a substantial angle relative to the holder 21, as the blade traverses curved and substantially planar surfaces, it is extremely important that the cantilever arm exert substantially the same force on the outer end of the flexible backing strip irrespective of the angular relationship between the arm 40 and the holder 21. Thus, the particular construction of the resilient means 80 is of particular importance in the present invention.

The wiper blade assembly also includes a roller 95, which is rotatably journaled on a pin, or shaft, 96, which is carried by the flexible backing strip 50, the pin 96 being in alignment with the longitudinal axis of the backing strip. While the roller 95 performs the same function as is pointed out in the aforementioned copending applications, namely, to prevent crowding of the squeegee element against a sharply curved surface by limiting the angle of tilt between the squeegee and the backing strip, it should be noted that whereas in the aforementioned applications, the axis of the roller is located to one side of the flexible backing strip, in the present invention the roller is located in alignment with the axis of the flexible backing strip.

While the embodiment of the present invention as herein disclosed, constitutes a preferred form, it is to be understood that other forms might be adopted.

What is claimed is as follows:

1. A wiper for cleaning a surface including, a flexible wiping element readily conformable to the surface to be cleaned, a flexible backing strip for supporting said wiping element, said backing strip having portions of different flexibility, a holder for distributing wiping pressure to said flexible backing strip, a yoke movably connected intermediate its ends to one end of said holder, opposite ends of said yoke being movably connected to longitudinally spaced points of said backing strip, an arm pivotally connected to the other end of said holder, the free end of said arm being slidably connected to said backing strip, the portion of the backing strip between the other end of said holder and the free end of said arm being of greater flexibility than the portion of the backing strip between said other end of the holder and the inner end of said yoke and resilient means for applying a substantially constant force to said arm irrespective of the angular relationship between the arm and said holder and normally deforming said flexible wiping element and backing strip.

2. A wiper for cleaning a curved surface including, a flexible squeegee unit readily conformable to the surface to be cleaned, means for applying wiping pressure to said squeegee unit including a holder, an arm pivotally connected to one end of the holder, the free end of said arm being movably connected with said squeegee unit, and a control spring, opposite ends of which are anchored to spaced points on said holder and said arm for applying a substantially constant force to said arm irrespective of the angular relationship between the arm and said holder.

3. A wiper for cleaning a curved surface including, a flexible squeegee unit readily conformable to the surface to be cleaned, means for applying wiping pressure to said squeegee unit including a holder, an arm pivotally connected to one end of the holder, the free end of said arm being movably connected with said squeegee unit, and a control spring, opposite ends of which are anchored to spaced points on said holder and said arm for applying a substantially constant force to said arm irrespective of the angular relationship between the arm and the holder, said control spring having an arcuate cross section and being bent with the concave surface thereof in contiguous relation with said arm, the radius of said bend being such that the end of the spring attached to said arm can move throughout a substantial angle without changing the spring force applied thereto.

4. A wiper for cleaning a curved surface including, a flexible squeegee unit readily conformable to the surface to be cleaned, means for applying wiping pressure to said squeegee unit including a holder, an arm pivotally connected to one end of the holder, the free end of said arm being directly and movably connected with said squeegee unit, resilient means for applying a substantially constant force to said arm irrespective of the angular relationship between the arm and said holder and normally deforming said squeegee unit, and cooperable means on said arm and holder for limiting pivotal movement therebetween so as to limit deformation of said squeegee unit.

5. A wiper for cleaning a curved surface including, a flexible squeegee unit readily conformable to the surface to be cleaned, means for applying wiping pressure to said squeegee unit including a holder, a U-shaped member attached to an intermediate portion of said squeegee unit having upstanding legs, an arm having one end movably connected with said squeegee unit adjacent the outer end thereof, the other end of said arm and one end of said holder being pivotally interconnected by a pin supported by the upstanding legs of said U-shaped member, and resilient means operatively associated with said arm for applying pressure thereto so as to normally deform said squeegee unit.

6. A wiper for cleaning a curved surface including, a flexible squeegee unit readily conformable to the surface to be cleaned, means for applying wiping pressure to said squeegee unit including a holder, a U-shaped member attached to an intermediate portion of said squeegee unit having upstanding legs, an arm having one end movably connected with said squeegee unit adjacent the outer end thereof, the other end of said arm and one end of said holder being pivotally interconnected by a pin supported by the upstanding legs of said U-shaped member, and a control spring, opposite ends of which are anchored to spaced points on said holder and said arm for applying a substantially constant force to said arm irrespective of the angular relationship between said arm and said holder.

7. A wiper for cleaning a curved surface including, a flexible squeegee unit readily conformable to the surface to be cleaned, means for applying wiping pressure to said squeegee unit including a holder, a U-shaped member attached to an intermediate portion of said squeegee unit having upstanding legs, an arm having one end movably connected with said squeegee unit adjacent the outer end thereof, the other end of said arm and one end of said holder being pivotally interconnected by a pin supported by the upstanding legs of said U-shaped member, and a control spring, opposite ends of which are anchored to spaced points on said holder and said arm, said control spring having an arcuate cross section and being bent through an arc of a predetermined radius whereby said control spring will exert a substantially constant force on said arm irrespective of the angular relationship between said arm and said holder.

8. A wiper for cleaning a curved surface including, a flexible wiping element readily conformable to the surface to be cleaned, a flexible backing strip for supporting said wiping element, said wiping element being freely tiltable relative to said backing strip, means for applying wiping pressure to said backing strip including a holder, an arm pivotally connected to one end of said holder, the free end of said arm being movably connected with the backing strip adjacent the outer end thereof, resilient means for applying a substantially constant force to said arm irrespective of the angular relationship between the arm and said holder, and means carried by said flexible backing strip and engageable with the surface to be cleaned for limiting tilting movement of said wiping element relative to said backing strip.

9. A wiper for cleaning a curved surface including, a flexible wiping element readily conformable to the surface to be cleaned, a flexible backing strip for supporting said wiping element, said wiping element being freely tiltable relative to said backing strip, means for applying wiping pressure to said backing strip including a holder, an arm pivotally connected to one end of said holder, the free end of said arm being movably connected with the backing strip adjacent the outer end thereof, said backing strip including a pair of spaced, interconnected longitudinally extending side flanges, said side flanges having a portion of gradually decreasing cross sectional area throughout a length substantially equal to the length of said arm with the minimum cross sectional area adjacent the outer end thereof whereby said portion of said backing strip will function as a cantilever spring, and resilient means operatively associated with said arm for normally deforming said flexible backing strip and wiping element.

10. A wiper for cleaning a curved surface including, a flexible wiping element readily conformable to the surface to be cleaned, a flexible backing strip for supporting said wiping element, said wiping element being freely tiltable relative to said backing strip, means for applying wiping pressure to said backing strip including a holder, an arm pivotally connected to one end of said holder, the free end of said arm being movably connected with the backing strip adjacent the outer edge thereof, a control spring, opposite ends of which are anchored to spaced points on said holder and said arm, said spring having an arcuate cross-section and being bent throughout an arc having a predetermined radius whereby irrespective of the angular relationship between said arm and said holder a substantially constant spring force will be exerted on said arm, and means carried by said backing strip and engageable with the surface to be cleaned for limiting tilting movement between said wiping element and said backing strip.

11. A wiper for cleaning a curved surface including, a flexible wiping element readily conformable to the surface to be cleaned, a flexible backing strip for supporting said wiping element, said wiping element being freely tiltable relative to said backing strip, means for distributing an arm applied pressure to said squeegee unit including a holder, a yoke movably connected intermediate its ends to one end of said holder, opposite ends of said yoke being movably connected to longitudinally spaced points of said backing strip, an arm pivotally connected to the other end of said holder, the free end of said arm being directly and movably connected to said backing strip, and at least one control spring having an arcuate cross-section, opposite ends of which are anchored to spaced points on said holder and said arm for exerting a substantially constant spring force on said arm irrespective of the angular relationship between said arm and said holder.

12. A wiper for cleaning a curved surface including, a flexible wiping element readily conformable to the surface to be cleaned, a flexible backing strip for supporting said wiping element, said wiping element being freely tiltable relative to said backing strip, means for distributing an arm applied pressure to said squeegee unit including a holder, a yoke movably connected intermediate its ends to one end of said holder, opposite ends of said yoke being movably connected to longitudinally spaced points of said backing strip, a U-shaped member anchored to said flexible backing strip and having a pair of upstanding legs, an arm, one end of which is movably connected to said flexible backing strip adjacent the outer end thereof, the other end of said arm and the other end of said holder being pivotally interconnected by a pin carried by the upstanding legs of said U-shaped member, and resilient means for applying a substantially constant force to said arm irrespective of the angular relationship between the arm and said holder.

13. A wiper for cleaning a curved surface including, a flexible wiping element readily conformable to the surface to be cleaned, a flexible backing strip for supporting said wiping element, said wiping element being freely tiltable relative to said backing strip, means for distributing an arm applied pressure to said squeegee unit including a holder, a yoke movably connected intermediate its ends to one end of said holder, opposite ends of said yoke being movably connected to longitudinally spaced points of said backing strip, a U-shaped member anchored to said flexible backing strip and having a pair of upstanding legs, an arm, one end of which is movably connected to said flexible backing strip adjacent the outer end thereof, the other end of said arm and the other end of said holder being pivotally interconnected by a pin carried by the upstanding legs of said U-shaped member, resilient means for applying a substantially constant force to said arm irrespective of the angular relationship between the arm and said holder, and means carried by the outer end of said flexible backing strip and engageable with the surface to be cleaned for limiting tilting movement of said wiping element relative to said backing strip.

14. A wiper for cleaning a curved surface including, a flexible wiping element readily conformable to the surface to be cleaned, a flexible backing strip for supporting said wiping element, said wiping element being freely tiltable relative to said backing strip, means for distributing an arm applied pressure to said squeegee unit including a holder, a yoke movably connected intermediate its ends to one end of said holder, opposite ends of said yoke being movably connected to longitudinally spaced points of said backing strip, an arm pivotally connected to the other end of said holder, the free end of said arm being movably connected with the outer end of said flexible backing strip, and resilient means for applying pressure to said arm so as to normally deform said flexible backing strip and wiping element, said flexible backing strip including a pair of spaced longitudinally extending side flanges which are interconnected by a plurality of spaced hooks, a portion of the length of said side flanges adjacent the outer end of said wiper being of gradually tapered thickness with a minimum thickness at the outer end thereof whereby said flexible backing strip will function as a cantilever.

15. A wiper for cleaning a curved surface including, a flexible wiping element readily conformable to the surface to be cleaned, a flexible backing strip for supporting said wiping element, said wiping element being freely tiltable relative to said backing strip, means for distributing an arm applied pressure to said squeegee unit including a holder, a yoke movably connected intermediate its ends to one end of said holder, opposite ends of said yoke being movably connected to longitudinally spaced points of said backing strip, a U-shaped member anchored to said backing strip intermediate the ends thereof and having a pair of upstanding legs, an arm, one end of which is movably connected to said backing strip adjacent the outer end thereof, the other end of said arm and the other end of said holder being pivotally interconnected by a pin carried by said upstanding legs of the U-shaped member, and resilient means for applying a substantially constant force to said arm irrespective of the angular relationship between the arm and said holder, said flexible backing strip comprising an integral metal member having a pair of spaced, longitudinally extending side flanges which are interconnected by a plurality of spaced hooks, a portion of said side flanges being of gradually tapered thickness adjacent the outer end of said wiper with the minimum thickness adjacent said outer end of said wiper, said portion extending outwardly from said U-shaped member and being of a length substantially equal to the length of said arm whereby said portion of said flexible backing strip will function as a cantilever spring.

16. The combination set forth in claim 15 wherein said resilient means comprises a spring having an arcuate cross-section, opposite ends of which are anchored to spaced points on said holder and said arm, said spring being bent throughout an arc having a predetermined radius whereby the end attached to said arm will exert a substantially constant force thereon throughout a substantial angle.

17. The combination set forth in claim 15 wherein said wiper includes a roller engageable with the surface to be cleaned for limiting tilting movement of said wiping element relative to said backing strip, said roller being carried by a shaft which is attached to the outer end of said backing strip.

18. A windshield wiper blade comprising, an elongate flexible body having a wiping edge, a flexible backing therefor having portions of different flexibility, an arm-pressure distributing member extending lengthwise of the body, a second member extending lengthwise of the body beneath one end of the first member and pivotally connected thereto for distributing arm pressure as transmitted to it by said one end, opposite ends of said second member being connected to the backing at longitudinally spaced points, said first member having its other end operatively connected to said backing, a third member extending lengthwise of the body and pivotally connected at one end to the other end of said first member, the other end of said third member being movably connected to said backing adjacent the outer end thereof, the portion of the backing between the other end of the first member and the other end of the third member being of greater flexibility than the portion of the backing between said other end of the first member and the inner end of the second member and resilient means interconnecting the first and third members for applying additional pressure to the portion of said backing of greater flexibility through said third member so as to normally deform the same.

19. A windshield wiper blade comprising, an elongate flexible body having a wiping edge, a flexible backing therefor, having portions of different flexibility an arm-pressure distributing member extending lengthwise of the body and having one end operatively connected to said backing through a direct connection and its other end indirectly connected thereto through a second pressure distributing member, a third pressure distributing member pivotally connected to said first member at said one end and movably connected to said backing adjacent the outer end thereof, the portion of the backing between said one end of the arm-pressure distributing member and the outer end thereof being of greater flexibility than the portion of the backing between said one end of the arm-pressure distributing member and the inner end of the second pressure distributing member, and resilient means inter-connecting said first and third members for applying additional pressure to the portion of the backing of greater flexibility so as to normally deform the same.

References Cited in the file of this patent

UNITED STATES PATENTS

| 2,589,339 | Carson | Mar. 18, 1952 |
| 2,664,583 | Oishei | Jan. 5, 1954 |
| 2,706,291 | Rappl | Apr. 12, 1955 |

FOREIGN PATENTS

| 683,271 | Great Britain | Nov. 26, 1952 |
| 1,033,521 | France | Apr. 1, 1953 |